United States Patent [19]

Shomler

[11] Patent Number: 5,379,385
[45] Date of Patent: Jan. 3, 1995

[54] METHOD AND MEANS FOR EFFECTUATING RULE BASED I/O DATA TRANSFER ADDRESS CONTROL VIA ADDRESS CONTROL WORDS

[75] Inventor: Robert W. Shomler, Morgan Hill, Calif.

[73] Assignee: International Business Machines Corporation, Armonk, N.Y.

[21] Appl. No.: 978,051

[22] Filed: Nov. 18, 1992

Related U.S. Application Data

[63] Continuation of Ser. No. 542,854, Jun. 22, 1990, abandoned.

[51] Int. Cl.$^6$ ............................................. G06F 13/00
[52] U.S. Cl. ..................................... 395/325; 395/425; 395/275; 364/DIG. 2; 364/946.2; 364/946.3; 364/952.9; 364/955; 364/957.4; 364/962.1; 364/967.1; 364/968
[58] Field of Search ............... 395/200, 325, 425, 600, 395/725, 275

[56] References Cited

U.S. PATENT DOCUMENTS

| | | | |
|---|---|---|---|
| 3,336,582 | 8/1967 | Beausoleil | 340/172.5 |
| 3,564,502 | 2/1971 | Boehner et al. | 340/172.5 |
| 3,725,864 | 4/1973 | Clark et al. | 340/172.5 |
| 4,056,843 | 11/1977 | Bishop et al. | 395/325 |
| 4,207,609 | 6/1980 | Luiz et al. | 395/325 |
| 4,262,332 | 4/1981 | Bass et al. | 395/425 |
| 4,466,059 | 8/1984 | Bastian et al. | 395/250 |
| 4,583,166 | 4/1986 | Hartung et al. | 395/425 |
| 4,620,295 | 10/1986 | Aiken, Jr. | 364/419.17 |
| 4,638,425 | 1/1987 | Hartung | 395/425 |
| 4,688,168 | 8/1987 | Gudaitis et al. | 345/325 |
| 4,787,026 | 11/1988 | Barnes et al. | 395/700 |
| 4,855,907 | 8/1989 | Ferro, Jr. et al. | 395/425 |
| 4,862,411 | 8/1989 | Dishon et al. | 395/425 |
| 4,956,803 | 9/1990 | Tayler et al. | 395/425 |
| 4,970,640 | 11/1990 | Beardsley et al. | 395/725 |
| 5,014,197 | 5/1991 | Wolf | 395/425 |
| 5,023,774 | 6/1991 | Sakai et al. | 395/275 |
| 5,041,970 | 8/1991 | Desjourdy | 395/425 |
| 5,062,042 | 10/1991 | Binkley et al. | 395/600 |
| 5,131,081 | 7/1992 | Mackenna et al. | 395/275 |
| 5,133,068 | 7/1992 | Crus et al. | 395/600 |

OTHER PUBLICATIONS

Patterson et al, "A Case of Redundant Arrays of Inexpensive Disks (Raid)" ACM SIGMOD Conference.
"MVS/Extended Architecture System Programming Library System Macros and Facilities", vol. 1.

*Primary Examiner*—Allen R. MacDonald
*Assistant Examiner*—Ayaz R. Sheikh
*Attorney, Agent, or Firm*—R. Bruce Brodie

[57] ABSTRACT

A method and means for CPU accessing a staged storage subsystem in which rules defining computation of the storage system addresses are distributed with the data, the rules and storage access being interpreted by the sub-system. The method uses local storage address computation in the DASD array context rather than CPU address list generation as has occurred in the prior art.

5 Claims, 3 Drawing Sheets

TACW LIST HEADER:

| FLAGS | # OF TACWs | RESERVED | CCW TRANSFER COUNT |
|---|---|---|---|

TACW FORMAT:

| TACW NUMBER | NEXT TACW # | TACW FLAGS | MA OP CONTROL | TACW TRANSFER COUNT |
|---|---|---|---|---|
| MEMORY ADDRESS | | | | MEMORY ADDRESS OPERATION VALUE |

I/O DATA BLOCKS:

| 4096 | 64 | 4096 | 64 | 4096 | 64 | 4096 | 64 | 4096 | 64 | 4096 | 64 |

BLOCK # 1    2    3    4    5    6

MEMORY LOCATION 'A'

| 4096 | 4096 | 4096 | 4096 | 4096 | 4096 |

I/O BLOCK # 1   2   3   4   5   6

MEMORY LOCATION 'B'

| 64 | 64 | 64 | 64 | 64 | 64 |

I/O BLOCK # 1 2 3 4 5 6

*FIG. 2*

32 KBYTE I/O DATA BLOCKS IN SEQUENCE ON I/O DEVICE

| 32768 | 32768 | 32768 | 32768 | 32768 | 32768 |

BLOCK # 1   2   3   4   5   6

MEMORY LOCATION 'A'

| 32768 | 32768 | 32768 | 32768 | 32768 | 32768 | 32768 | 32768 |

BLOCK # 1   2   3   4   5   6

*FIG. 3*

```
CCW 1   <INSTRUCE I/O DEVICE WHICH 256 BLOCKS TO TRANSFER>
CCW 2   MEMORY ADDRESS=A        COUNT=4096   DATA CHAIN FLAG
CCW 3   MEMORY ADDRESS=B        COUNT=64     COMMAND CHAIN FLAG
CCW 4   MEMORY ADDRESS=A+4096   COUNT=4096   DATA CHAIN FLAG
CCW 5   MEMORY ADDRESS=B+64     COUNT=64     COMMAND CHAIN FLAG
CCW 6   MEMORY ADDRESS=A+8192   COUNT=4096   DATA CHAIN FLAG
CCW 7   MEMORY ADDRESS=B+128    COUNT=64     COMMAND CHAIN FLAG
         ⋮
CCW 512 ADDRESS A+(255*4096)    COUNT=4096   DATA CHAIN FLAG
CCW 513 ADDRESS B+(255*64)      COUNT=64     NO FLAGS (END OF CHAIN)
```

*FIG. 5*

METHOD AND MEANS FOR EFFECTUATING RULE BASED I/O DATA TRANSFER ADDRESS CONTROL VIA ADDRESS CONTROL WORDS

This application is a continuation of U.S. application Ser. No. 07/542,854 filed on Jun. 22, 1990, now abandoned.

FIELD OF THE INVENTION

This invention relates to methods and means for minimizing path time occupancy in the exchange of data between CPU internal memory and attached external storage subsystems, and more particularly, to those exchanges where some of the data are located in non-contiguous memory or storage locations.

DESCRIPTION OF RELATED ART

The following paragraphs describe in summary fashion the CPU, operating system, memory, and storage organization of a hierarchically controlled computer system exemplified by the IBM System/370. In such a system, I/O is managed by a dedicated virtual machine termed a "channel" which effectuates the access and movement of data between CPU internal memory and external storage.

Consistent with hierarchical system management, the channel manifests control by way of a series of channel commands communicated to and interpreted by the external storage subsystem (Clarke et. al.). The CPU internal memory addresses to which data are to be exchanged are expressed by way of a list of address words (CCW's or S/370 Indirect Address List Facility). The List processing associated with the access and transfer takes significant time.

While command encapsulation (Yates and Bass references) is one known measure for reducing the number of additional command exchanges between the external storage subsystem and the channel it does not alleviate the list processing of addresses in the data transfer. Relatedly, external storage sub-systems in the form of DASD arrays (see Brady et. al. below) and parallel access transfer data from non-contiguous locations and otherwise impose extensive list processing requirements.

CPU AND SOME OPERATING CONSTITUENTS

A CPU or processor typically includes a local operating system (OS), RAM implemented internal store, local instinction and data caches operatively formed from the internal store, an external store, and lock, cache, and storage resource managers.

Applications (processes/tasks) executing on a CPU generate read and write operations by way of the OS. In turn, the read and write operations utilize the data cache and lock resource managers to establish directory lockable access paths to data (pages, records, files) either resident in the data cache or as refreshed into the data cache from the external store.

INTERNAL AND EXTERNAL STORAGE IN THE FORM OF DASD

Many computer systems divide the physical storage subsystem into a number of performance levels. Some of these levels, such as DASD and tape, have been treated as shared access peripheral I/O devices and are accessed over an asynchronous path. Other levels, such as RAM and cache, have been treated directly by system hardware and accessed over a synchronous path as part of internal storage.

The term "internal storage" or "system storage" specifies that portion of storage randomly addressable for single teach or write transfers. In IBM systems, internal storage is byte addressable except for an extension ("expanded store"). Expanded store is random accessed on a block or page addressable (4096 bytes/page) basis. As one of several techniques, expanded store may be managed as an LRU real memory backed paging store. The choice of unit of data size or frame is arbitrary. Lastly, "external storage" refers to that bulk portion of storage that is not randomly addressable and must be directly accessed as on DASD.

For purposes of this invention, a DASD is a constant speed rotating magnetic storage disk device supporting direct access by read/write heads. Because the magnetic disk medium is rotating, each data access requires positioning movable read/write heads in space and time over concentric tracks on the disk. The disk is also characterized as being a cyclic track recording medium.

THE CPU COMMUNICATES WITH EXTERNAL STORAGE OVER A CHANNEL ARCHITECTED AS A VIRTUAL I/O MACHINE

One of the aspects of multi-programming is the opportunity for a CPU to interleave I/O tasks with other work. Relatedly, the IBM System 360 architecture introduced a virtual machine dedicated to accessing and exchanging data between the CPU internal memory and attached external storage or other devices over a physical path connection. In this regard, the virtual machine was in the form of a collection of software procedures associated with control and data exchange. It was responsible for allocating the resource to the CPU and controlling references to it.

The virtual machine is invoked by a high level OS command (GET, PUT). Control is passed from the CPU to the virtual machine (denominated a channel) by a START I/O command and instructions under the aegis of the channel would execute until the I/O task was either completed, suspended, or aborted. The channel, in turn, would send series of subordinate commands (termed channel command words or CCW's) directing an attached I/O controller to perform preparatory (SEEK, SET SECTOR, STATUS) or executory acts (READ, WRITE).

It was early recognized that many channel commands relating to DASD I/O access such as SEEK and SET SECTOR did not involve the transfer of data. However, the logical channel would be reserved or otherwise bound to the accessing channel software task. Certainly, it was reasoned the CPU could be released until data was ready to be exchanged and then reconnected after the non-data command was completed.

Because the movement of data onto and off of one or more DASD's is a streaming affair, the actual data exchange between external storage and a dedicated portion of CPU internal memory was necessarily synchronous. This avoided over and under flow of the relatively limited RAM buffering in the exchange path and either the internal memory in execution of a READ CCW or a DASD in connection with a WRITE CCW.

CLARK ET. AL.

The aforementioned "channel as virtual machine" was exemplified in Clark et. al., U.S. Pat. No. 3,725,864, "Input/Output Control". Clarke described a physical path connection involving a channel, a IOCU communicating with the channel on one side in an asynchronous relationship, and, selected DASDs on the other side. The operating system of the CPU initiated the transfer by a START I/O instruction. This caused control to be relinquished to a series of channel commands (CCW's). A sequence or chain of channel commands was, in turn, sent from the CPU over the channel to the IOCU for selecting and accessing the storage DASD as well as effectuating the data movement across the interface. In this regard, the IOCU interpreted the CCW's and responded accordingly.

As pointed out by Clark et. al., the CPU using this architecture was connectable to a DASD only over this dedicated path for a given channel program. Disconnection and reconnection over any other path involved executing a new START I/O operation. As a result, path finding and selection at the CPU level occupied significant CPU processing time for each START I/O operation. Restated, single path connections in the prior art were deemed sufficient for single transactions.

SYSTEM 370 AND USE OF CHANNEL AND INTERNAL MEMORY IN DATA EXCHANGE WITH EXTERNAL STORAGE

In broad terms, there are two mechanisms used in an IBM S/370 architected machine for associating data to be transferred and CPU internal memory addresses. These were DATA ADDRESS+COUNT in a CCW or DATA ADDRESS+IMPLIED COUNT BOUNDARY in an Indirect Address Word (IDAW) as set out in the IBM Systemic/370 Indirect Address List Facility (IDAL). In the latter case, the S/370 IDAL facility generates an internal memory address from a list of addresses according to a fixed rule (every 2048 data bytes) rather than from the data address filed in a CCW. In terms of CCW's in order to transfer a large data segment (1000K bytes) divided into pages or blocks of some uniform size (4K bytes) would require a list or chain of 500+.

YATES AND BASS RE COMMAND MESSAGE ENCAPSULATION

Yates, "New Channel Command Word Commands", IBM Technical Disclosure Bulletin, volume 18, page 3430, March 1976 and Bass et. al., U.S. Pat. No. 4,262,332, "Command Pair to Improve Performance and Device Independence", issued Apr. 14, 1981, both relate to command message encapsulation between a CPU and a subsystem.

Yates shows encapsulation into a single message of a multi-function command for remote reception and execution by a second DASD. Also, Bass et. al. teaches the use of a pair of sequential commands issued by a CPU to control access to DASD data which is recorded in fixed block form (FBA). The first command defines the boundaries of the DASD space accessible to the CPU while the second command specifies an operation and address. Significantly, each access in Bass outside of the prescribed storage boundaries on the storage DASD requires the series of commands to be restarted in the CPU.

ARRAYS AND OTHER SOURCES OF NON-CONTIGUOUS DATA

For purposes of this invention, an "array" has two meanings. The first refers to an indexed row and column formatted data type. The second connotes a type of synchronous arrangement of N DASD's in external storage susceptible of parallel operation. When transferring a data array between a CPU internal memory and a DASD array, it is desired to preserve the array "shape" or "stride". This means that the address intervals over which the next row or column in a row or column major ordered data array should be mapped are preserved.

In the co-pending Brady et. al., U.S. application Sr. No. 07/528,999, filed May 24, 19901, "METHOD AND MEANS FOR ACCESSING DASD ARRAYS WITH TUNED DATA TRANSFER RATE AND CONCURRENCY" (SA9-89-028), there is disclosed and claimed a method for adjusting the data rate and concurrency with respect to read and write accesses by a CPU of at least one logical track having KN sequentially ordered blocks distributed and stored onto an external store in the form of an array of N DASD's. In this regard, each DASD physical track has a storage capacity of K blocks. Also, the array of N DASD's included control means for securing synchronous access to selectable ones of the N DASD's.

The method steps comprise (a) formatting the KN blocks onto N tracks of the N DASD's of the array in row major order K modulo M and in column major order K modulo MN, M being less than or equal to K; and (b) executing large and small access requests over the array such that each access involves a synchronous data exchange of b blocks at a time with b counterpart DASD's such that (N-b) DASD's are concurrently available for binding to another access request. Significantly, M is the parameter used for balancing the data rate and concurrency.

SUMMARY OF THE INVENTION

It is accordingly an object of this invention to devise a method and means for minimizing CPU and path time occupancy in the transfer of data between the CPU internal memory and external storage over a path including a channel and a DASD controller therebetween.

It is a related object that such method and means tune the transfer between CPU internal memory and an external store selected from DASD, DASD strings, DASD arrays, tape, and the like.

It is yet another object that such method and means preserve the address intervals into which data array rows and columns are transferred between CPU internal memory and an external store formed from an array of N DASD.

The foregoing objects are satisfied by a CPU implemented method and means for accessing an external storage sub-system in which rules defining computation of the internal memory addresses are distributed with the data to a virtual I/O machine termed a "channel". The internal memory addresses are determined by computational rule by the channel. This ensures that shape of the data transferred between internal memory addresses and external storage will remain invariant and time and occupancy required by the address list management associated with the prior art transfers is avoided.

More particularly, the method of this invention comprises the steps of: (a) transferring at least one rule from the CPU to said channel, said rule defining one or more main memory address computations according to at least a first one of said series of channel commands (CCW's); and (b) responsive to said rule, generating address arguments by the channel, and responsive to any access command in the series of CCW's, causing any data transferred to be accessed at main memory locations, locations specified by the generated address arguments.

BRIEF DESCRIPTION OF THE DRAWING

FIG. 2 shows the storage of data pages or blocks on a DASD and at internal memory locations separate from page/block control information currently fashioned to facilitate system management of storage FIG. 3 depicts data blocks used in numerically intensive computation as stored on DASD and in internal memory where shape or stride is preserved.

FIG. 5 shows a CCW chain of addresses according to the prior art.

DESCRIPTION OF THE PREFERRED EMBODIMENT

THE HOST CPU ENVIRONMENT FOR EXECUTING THE METHOD OF THE INVENTION

The invention can be conveniently practiced in a general purpose computer such as an IBM/360 or 370 architected CPU having the IBM MVS operating system. An IBM/360 architected CPU is fully described in Amdahl et. al., U.S. Pat. No. 3,400,371, "Data Processing System", issued on Sep. 3, 1968.

An MVS operating system is set out in IBM publication GC28-1150, "MVS/Extended Architecture System Programming Library: System Macros and Facilities", Volume 1. Details of standard MVS or other operating system services such lock management, subsystem invocation by interrupt or monitor, and the posting and waiting of tasks is omitted. These OS services are believed well appreciated by those skilled in the art.

CPU, CHANNEL, AND EXTERNAL STORAGE SUBSYSTEM ARCHITECTURE

Figures 1, 6:
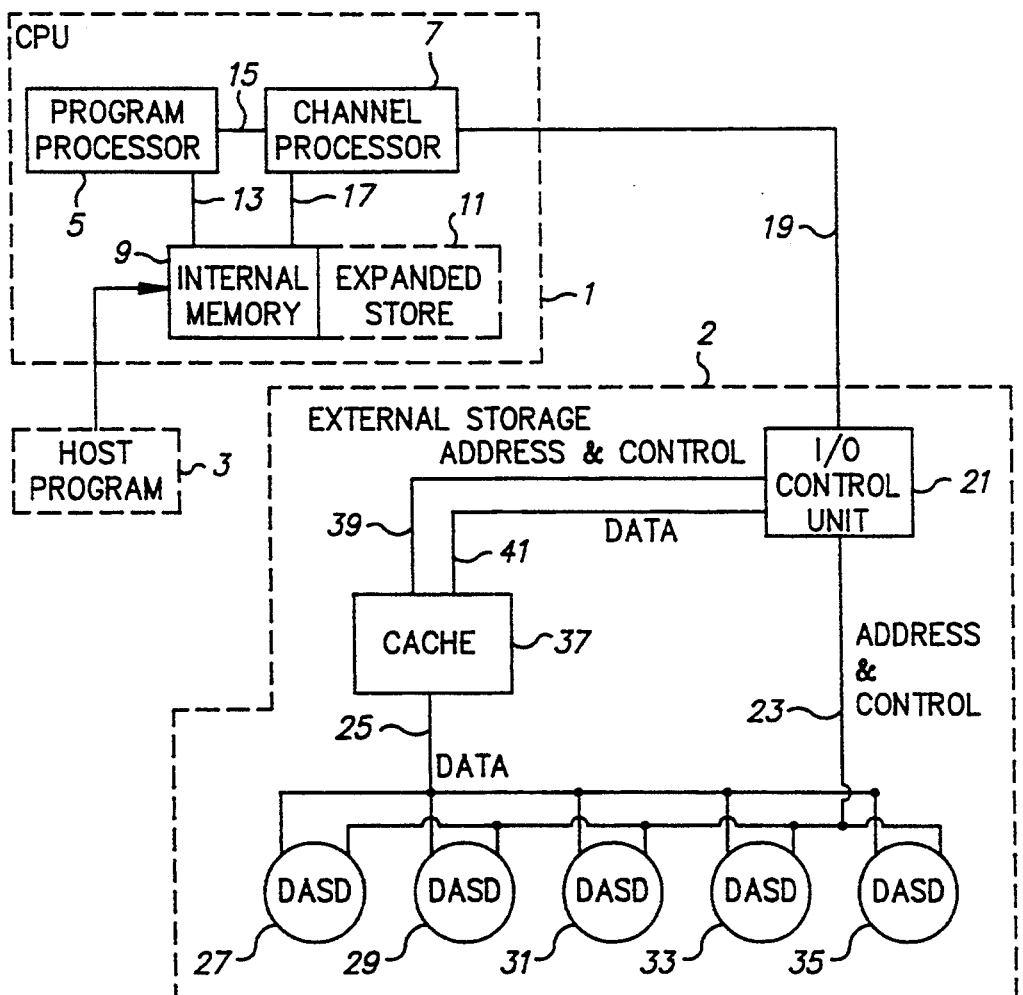
FIG. 1 depicts a hierarchical CPU, channel, and external storage architecture environment for the practice of the invention.
FIG. 6 illustrates a representative format for Transfer Address Control Words (TACW) embodying the computational rule for determining successive internal memory addresses used in the data exchange between CPU internal memory and external storage.

Referring now to FIG. 1, there is shown a hierarchical CPU 1, channel 7, coupled to external storage 2 over path 19. CPU 1 includes a byte addressable RAM internal memory 9 and a page or block addressable RAM expanded store 11. Internal memory a2, so includes program and data caches (not shown). Ordinarily, portions of executing applications and operating system software 3 are resident in internal memory 9. For execution the program processor 5 and channel processor 7 are coupled to memory over paths 13 and 17. The channel 7 as a dedicated I/O processor may be implemented in real or in virtual in whole or in part. Significantly, channel 9 is in communication with external store 2 over path 19. In this regard, path 19 comprises separate data and control lines terminating in I/O Control UNIT 21 (IOCU). It should be appreciated that other equivalent path modalities may also be utilized such as a serial link within which the control and data paths are merged.

External store 2 may comprise conventional selectable DASD strings coupled to the channel 7 over demand/response interfaces by way of at least one path having buffered staged controllers as shown for example in Clark et. al., Beausoleil, U.S. Pat. No. 3,336,582, Boehner et. al. U.S. Pat. No. 3,564,502., and Luiz et. al., U.S. Pat. No. 4,207,609. Alternatively, external store 2 may comprise a DASD array. In this rendition, IOCU 21 attaches N DASD's 27, 29, 31, 33, 35 directly over a control and addressing path 23 and indirectly over a data path including path 25, cache/buffer 37 and control and data paths 39 and 41. For purposes of this specification, the data mapping between CPU internal memory and external storage will assume a type 2H N DASD array described in the copending Menon application.

Type 2H N DASD Array as External Storage

As used in this specification, an "N DASD array" is any arrangement of synchronized DASD's which may selectively accessed in parallel i.e. accessed in an identical manner at the same time. Synchronous behavior requires N DASDs to rotate at the same rpm, have the same angular offset, and be accessed in an identical manner at the same time. Relatedly, the formatting and subsequent read/write accessing of an array, as a logical/physical store proceeds by copying/inserting values in consecutive positions on either a row or a column basis. If the operation is performed in a column direction, it is designated as being performed in "column major order". Likewise, if performed a row direction, it is designated as being performed in "row major order". Next, the mapping is done 10 from the logical "array" to the physical store (i.e. ganged group of DASDs).

The indexed positions of blocks in the array are mappable onto "closed integer intervals". As used in this invention, a "closed integer interval" is one over which an index variable can assume all INTEGER interval values including the end points.

The "Type 2H DASD array" is a version of the level 4 and 5 arrays as described by Patterson et. al., "A Case for Redundant Arrays of Inexpensive Disks (RAID)", ACM SIGMOD Conference, Chicago Ill., Jun. 1–3, 1988 and modified in the co-pending Menon application. In this regard, the type 2 array improves performance with respect to small read and write accesses. This is achieved by storing blocks along the column extent so that in a first time slot (DASD sector 1) blocks 1 to N can respectively be stored on DASD 1 to N while in the second time slot (DASD sector 2) blocks N+i to 2N are stored etc. In the Kth time slot (DASD sector K) blocks [(K−1)]*N+1 to KN are stored on corresponding devices.

In addition to column track layout, the Patterson fourth level permits access to DASD individually. This means that small transfers can occupy few DASDs while large transfers can also be accessed synchronously across N devices.

Figure 4:
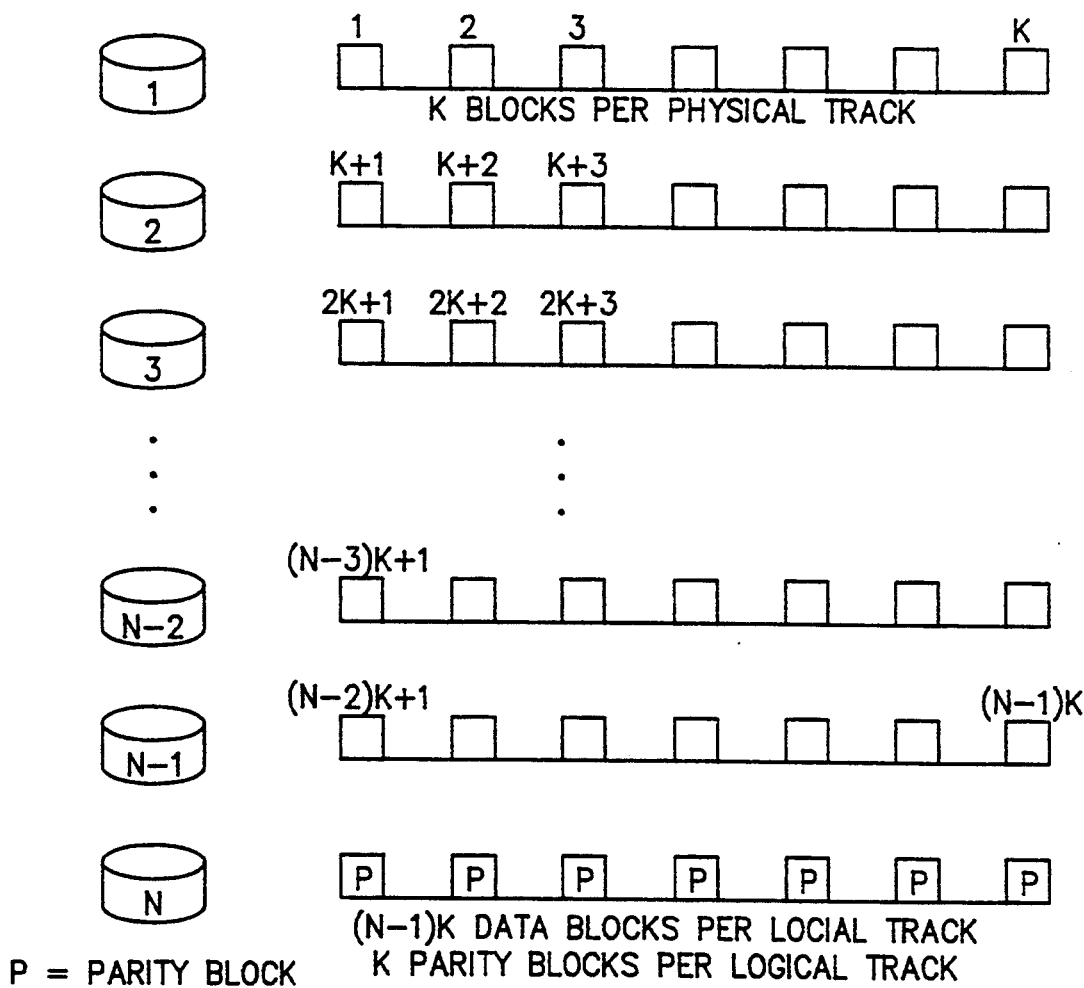
FIG. 4 sets forth the mapping of an NK block logical track mapped onto a row track layout of a type 2H array of N DASD's.

Referring now to FIG. 4, from the perspective of the application executing at CPU 1, the accessing/addressing problem is that of mapping NK blocks of an arbitrary logical track onto K blocks per physical track over N DASDs. The K block contents of a physical track can be mapped onto a time line such as that defined by a single DASD disk rotation. For the ith DASD, the contents of each block position on the time line or counterpart track extent constitute K column entries for the ith row. Likewise, for any jth time line segment or angular position along a physical track on a counterpart disk from each of thee N DASDs, the contents of N blocks occupying that sector over N DASDs constitute N row entries for the jth column.

From a performance perspective as viewed from a CPU. The array appears as a single logical store providing data at N−1 times the data rate of a single DASD and having N−1 times the capacity of the native device. The model assumes that of the NK blocks per logical track, K blocks are dedicated to parity spanning a predetermined number of the (N−1)K data blocks. The inherent redundancy of DASDs in an array permits the logical store to remain operable, even in degraded mode, over a longer interval (mean time between failures) than the MBTF interval of single DASD.

The next several paragraphs summarize the channel and external storage data exchange protocols.

START I/O AND TRANSFER OF CONTROL TO CCW SEQUENCE

A CPU's relationship to a DASD in a CPU of the IBM System 360/370 type begins when the CPU 1 invokes the START I/O instruction. This instruction serves to establish a connection between the CPU 1 and an addressed DASD and the execution of a channel program with the DASD. The invocation of the START I/O instruction causes control to be relinquished to a series of channel commands. This series or chain of channel commands (CCW's) is, in turn, sent over the channel path 19 to the IOCU 21 unit for selecting and accessing the DASD subset (27–35) of interest and for effectuating any data movement across the interfaces. As suggested, each channel program consists of a sequential list of operations resident in the CPU main memory. In the prior art, it has used a chained lists of data addresses in the form of CCW's to also define location of the data object to be moved or transferred.

The transmission to and execution at IOCU 21 of the commands from the CCW's takes place only after initial connection between the CPU 1 and the IOCU takes place. For each operation (CCW) in the channel program, one or more counterpart operations are required either at the IOCU or DASD level over an active connection. Of course, the list or CCW sequence may be discontinuously executed (segmented).

ACTIVE CONNECTIONS FOR DATA TRANSFER AND DISCONNECTED MODE FOR DASD CONTROL CCW'S

Referring again to FIG. 1, the following is an enumeration of the active connections among channel 7, IOCU 21, and DASD's 27-35. The first active connection is denominated as an initial selection sequence. This sequence is invoked with a CPU START I/O operation in which an initial path is set up both electrically and logically in terms of DASD address (virtual/real) and DASD status (available/busy). The next 16 active connection relates to that of CCW command transfer and execution. A control CCW such as a SEEK requires physical positioning or activity at the DASD. A IOCU, in response to receipt of a control CCW, can execute the CCW in disconnected mode. This means that the IOCU disconnects from the channel while executing the indicated operation. The IOCU does not require any more channel activity until it reconnects to said channel.

In a typical IBM 370 System as described in the above-named references, after a IOCU has received a SEEK CCW and the parameters (target address) it disconnects for 10 milliseconds or more. 10 milliseconds is an average time it takes to dispatch an accessing arm of a DASD in order to arrive at the tracks of a cylinder of interest. During this "dead time" both the channel and the IOCU are free to establish other connections. In contrast to disconnected modes, CCW's involving the movement or transfer of data between the channel and the DASD, such as READ or WRITE CCW's require the IOCU to remain connected to the channel in order to effectuate the data transfer.

NON-CONTIGUOUS DATA

Referring now to FIG. 2, there is shown the storage of data pages or blocks on a DASD track and at internal memory locations. Note, that each page/record/block is stored on DASD (external storage) contiguous to its descriptor. However, in the CPU internal memory 9, the descriptor may be stored noncontiguously. This is to facilitate system managed storage of data with respect to allocation, recovery, security, and aging out etc.

Referring now to FIG. 3, there is depicted data blocks used in numerically intensive computation as stored on DASD and in internal memory where shape or stride is preserved. That is, consecutive array data values may not be stored contiguously in internal memory as where N blocks at a time are read from a row major formatted DASD array as in FIG. 4.

RULES AND TRANSFER ADDRESS CONTROL WORDS (TACW)

The term "rule" means a computation direction or accessing step. In the context of this invention, rules are processed by the channel and direct the data transfer to alternate between transferring pages to and from internal memory address A and the descriptors to and from internal memory address B as set out in FIG. 2. Rules are defined to the channel via a list of Transfer Address Control Words (TACW) as depicted in FIG. 6. The list begins with a header identifying the number of TACW's, the total transfer length of the list, and a stated number of TACW's. Each TACW contains a memory address for data transfer, a transfer count, specification of the memory address following transfer, and the index of the next TACW for the channel to process. Now, the index to the next TACW is not shown in FIG. 6 but remains implicit. That is, the next TACW is implicit because it is part of a sequential list. It follows that the "next TACW index" is useful if the TACW's themselves are executed in other than a repetitive top-to-bottom sequence.

OPERATIONS USING RULES CONTROLLED ACCESSING OF INTERNAL MEMORY

The steps of this operation are as follows:

(1) An application executing on the CPU by way of the OS prepares a request to channel 7 by storing into internal memory 9 the control words (TACW's) appropriate to instruct channel 7 to select the DASD array IOCU 21 and to read say 1 megabyte of data from the DASD array into the internal memory.

(2) As part of this I/O request to channel 7, the method specifies 'stride' of memory address to channel by building a list of four TACWs. In the illustrative example, suppose that that K=64 and N=4 i.e. assume four DASD's in synchronism i.e DASD's 27–33.

(3) The method causes an I/O instruction on processor 5 to signal the channel 7 to perform requested I/O operation, the parameters of which have been stored in memory by the operation of preceding steps (1) and (2).

(4) The channel 7 selects the IOCU 21 and passes it the parts of the I/O request, as per S/370 specifications, that instruct the IOCU to transfer 256 4096-byte data blocks. In this example, the first such addressed data block is the first recorded 4096-byte block on a given track of DASD.

(5) The IOCU instructs DASD's 27–33 to position to the beginning of the track on which the first record will be found and transfer data blocks to cache/buffer 37 in IOCU.

(6) At some later time, the DASD become positioned and begin their transfer. All four DASD's, being rotation and index point synchronized, will concurrently transfer the first block recorded on the selected track (block numbers 1, K+1 or 65, 2K+1 or 129, and 3K+1 or 193 into IOCU cache/buffer 37.

(7) IOCU transfers these four data block to channel 7 in sequence given in step (6).

(8) Channel 7 interprets the first TACW in list (of four TACWs) to determine address in internal memory 9 to store data as it arrives from IOCU 21 over paths 19, 7, 17. Channel 7 begins storing first byte in address A, continuing for 4095 more bytes, incrementing memory address A by one and decrementing transfer count from that TACW by one for each byte stored into internal memory 9. It is the case that data while passing through a channel in the sense of a conduit does not necessarily have to pass through the channel processor. The DASD to internal memory path, once established, supports as near synchronous a data stream transfer as possible. This means that it is not necessarily to tie the channel as a processor for the stream transfer of data.

(9) After the 4096th byte has been stored, the channel recognizes that count in this TACW has been decremented to zero, and then increments the memory address in that TACW by 4096 and accesses the next TACW to obtain memory address to store next data byte from IOCU.

(10) The channel uses the memory address in the next (second) TACW, A+(4096×64), to store the next byte of data from IOCU, byte 4097, which is the first byte of data block 65 (in the transfer sequence of 256 blocks). As data bytes are received from the IOCU, the channel proceeds to store the next 4095 bytes as described in step (8).

(11) The channel performs step (8) and (9) with the third and fourth TACWs in turn, storing records 65, 129, and 193 into memory.

(12) DASD's 27–33 continue transfer of their next data blocks on the track to the IOCU buffer, the IOCU in turn transferring those data blocks to the channel in sequence 2, K+2 or 66, 2K+2 or 130, 3K+2 or 194, 3, and so on.

(13) Channel 7 stores 16,384 data bytes received from the IOCU, representing the four data blocks described in step 12, using the updated internal memory addresses in each of the four TACWs in turn, as described for steps (8)–(11).

(14) Channel 7 continues for each subsequent 16,384 byte group of bytes, storing them in memory using addresses from the four TACWs in sequence, each TACW in its turn providing a memory address for 4096 bytes. This sequence continues until the 1,048,576 bytes requested by the program have been stored in memory or until some exception condition prematurely terminates the channel's operation.

EXTENSIONS

As an alternative, suppose in step (2), a single construct is defined containing the values (a) memory address (A), (b) block (C, 4096), (c) stride (K, 64), and (d) cycle (N, 4). The preceding example would proceed as described though step (7). On receipt of the first data byte from the IOCU, the channel would proceed with the following steps:

(8') The channel would store 4096 (C) bytes beginning at address A.

(9') After storing 4096(C) bytes, the channel would increment its memory address by the stride (four) times the count (4096), then store the next 4096 (C) bytes from the IOCU.

(10') After N sequences of steps 8 and 9, the channel increments address A by the 16,384 (N×C) bytes it has processed and repeats 4 sequences of steps 8 and 9 for the next 16,384 bytes of data from the IOCU, continuing until the 1,048,576 bytes requested by the program have been stored in memory or until some exception condition prematurely terminates the channel's operation.

These and other extensions of the invention may be made without departing from the spirit and scope thereof as recited in the appended claims.

I claim:

1. A method for minimizing CPU and path time occupancy in any transfer of data between an internal memory of a CPU and an external store over a path including a channel and the external store, said external store including a controller for establishing an access path to elements of said external store, said channel constituting a virtual processor for establishing access and a physical path connection between said CPU internal memory and said external store controller, said CPU including an operating system (OS) for initiating a transfer responsive to an access request from a process executing on said CPU, the initiation thereby causing control to be relinquished to the channel, the channel in turn generating a series of commands, ones of said series of commands being sent to the controller for execution and including commands for selecting and accessing the external store and effectuating the data transfer, wherein the method comprises the steps of:

(a) storing at least one rule in internal memory responsive to said access request from said process executing on said CPU, said rule defining one or more internal memory address computations including an address stride according to at least a first one of said series of commands, maintenance of said stride during a data transfer, stride being an address interval over which contiguity and order of data in the internal memory or storage subsystem being accessed is preserved, said stride being maintained in that the number of locations within its bounds remains constant during any subsequent processing utilizing the rule to which it is a counterpart;

(b) transferring at least one rule by said OS from said CPU internal memory to said channel; and (c) responsive to said rule, generating internal memory address arguments by the channel, and responsive to any access and in the series, causing any data transferred to the external store or received from said external store to be accessed at internal memory locations specified by the generated address arguments.

2. The method according to claim 1, wherein said external store includes an array of direct access storage devices (DASD's).

3. The method according to claim 1, wherein the external store storage devices selected from a class consisting of an array of N direct access storage devices (DASD's), a string of DASD's, and a magnetic tape storage sub-system.

4. A method for transferring data between locations in the internal memory of a CPU and an array of N direct access storage devices (DASD's) over a path including a CPU resident channel and an array control means, said channel constituting a virtual processor for establishing access and a physical path connection between said CPU internal memory and the array control means, each DASD including a capacity of K track recording medium, each track having a storage capacity of K blocks, said array control means securing synchronous access to selectable ones of the N DASDs, said CPU including an operating system (OS) for initiating a transfer responsive to an access request from a process executing on said CPU, the initiation causing control to be relinquished to the channel, the channel in turn generating a series of commands, ones of said series of commands being sent to the array control means for execution and including commands four selecting and accessing the array of N DASD's and effectuating the data transfer, wherein the method comprising the steps of:

(a) storing at least one address modification rule in internal memory responsive to said access request from said process executing on said CPU;

(b) transferring at least one rule by said OS from said CPU internal memory to said channel, said rule defining one or more internal memory address computations according to at least a first one of said series of commands, said rule specifying an internal memory address stride of K modulo MN, M being a parameter lying in the closed integer interval $1<M<K$, said stride being maintained during a data transfer, stride being an address interval over which contiguity and order of data in the memory or storage subsystem being accessed is preserved, said stride being maintained in that the number of locations within its bounds remains constant during any subsequent processing utilizing the rule to which it is a counterpart; and (c) responsive to said rule, generating internal memory address arguments by the channel, and responsive to any access command in the series, and causing any data transferred to the DASD array or received from the array to be accessed at internal memory locations specified by the generated address arguments.

5. In a system comprising a CPU having an internal memory, an array of N direct access storage devices (DASD's), and means for synchronously accessing selectable ones of the DASDs and for randomly accessing the internal memory for transferring data blocks there between, said CPU including an operating system (OS) for initiating a data transfer between said internal memory and said DASD array, said initiation being responsive to an access request from a process executing on said CPU, the initiation thereby causing control to be relinquished to a virtual processor resident in said CPU, said virtual processor in turn generating a series of commands, ones of said series of commands being sent to the accessing means for execution, said series including commands for selecting and accessing the storage device and for effectuating the data transfer, and, said accessing means including means for read and write accesses of KN sequentially ordered blocks distributed and stored onto N DASD's of the array, each DASD including a cyclic track recording medium, each track having a storage capacity of K blocks, and means for formatting the KN blocks onto N tracks of the N DASDs of the array in row major order K modulo M and in column major order K modulo MN, M being a parameter lying in the closed integer interval $1<M<K$; wherein the system further comprises:

(a) means for storing at least one rule in said CPU internal memory responsive to said access request from said process executing on said CPU, said rule defining one or more internal memory address computations according to at least a first one of said series of commands, said rule specifying an internal memory address stride of K modulo MN, stride being an address interval over which contiguity and order of data in the memory or storage subsystem being accessed is preserved, said stride being maintained in that the number of locations within its bounds remains constant during any subsequent processing utilizing the rule to which it is a counterpart;

(b) means for transferring at least one rule from said CPU to said accessing means; and (c) means including the accessing means responsive to any access command in the series for generating internal memory address arguments and for causing any data transferred to be accessed at internal memory locations specified by the generated address arguments.

* * * * *